United States Patent [19]

Ochiai

[11] 4,348,944
[45] Sep. 14, 1982

[54] BRAKE BOOSTER

[75] Inventor: Chiaki Ochiai, Chiwyu, Japan

[73] Assignee: Aisin Seiki Kabushiki Kaisha, Kariya, Japan

[21] Appl. No.: 161,305

[22] Filed: Jun. 20, 1980

[30] Foreign Application Priority Data

Jun. 22, 1979 [JP] Japan .............................. 54-84876[U]

[51] Int. Cl.³ .......................... F15B 9/10; F01B 19/00; F16J 3/02
[52] U.S. Cl. ............................... 91/369 A; 91/376 R; 92/99
[58] Field of Search ............. 91/369 A, 369 B, 369 R, 91/376 R; 92/98 R, 98 D, 99, 100

[56] References Cited

U.S. PATENT DOCUMENTS

| 3,938,424 | 2/1976 | Ohmi | 91/369 B |
| 3,981,227 | 9/1976 | Azuma | 91/376 R |
| 4,005,639 | 2/1977 | Welsh, Jr. | 91/369 A |
| 4,245,845 | 1/1981 | Ando et al. | 92/98 D |
| 4,257,312 | 3/1981 | Ohmi et al. | 92/99 |

FOREIGN PATENT DOCUMENTS 2808622 8/1978 Fed. Rep. of Germany .... 91/369 B

Primary Examiner—Paul E. Maslousky

Attorney, Agent, or Firm—Oblon, Fisher, Spivak, McClelland & Maier

[57] ABSTRACT

A brake booster for operation in connection with a brake pedal which includes a housing having an inner wall, a diaphragm, an outer rim portion thereof being secured to the inner wall of the housing, and power piston movably disposed in the housing and air-tightly connected to an inner end portion of the diaphragm to thereby divide an interior space of the housing into first and second compartments, the power piston including a central portion composed of resin and a metallic disc member surrounding and connected to the central portion, a control valve mechanism positioned within the power piston for generating a pressure difference between the first and second compartments in response to operation of the brake pedal, and a connecting mechanism for connecting the central portion and the metallic disc member wherein the connecting mechanism includes a flange portion formed on an outer peripheral portion of the central portion of the piston and positioned in front of a radially inner peripheral portion of the metallic disc member and a plate mechanism having a plurality of detent members operably associated therewith, interposed between the flange portion and the inner peripheral portion of the metallic disc member and secured to the inner peripheral portion of the metallic disc.

4 Claims, 5 Drawing Figures

4,348,944

BRAKE BOOSTER

BACKGROUND OF THE INVENTION

1. Field of the Invention

This invention relates generally to a brake booster and, more particularly, to a connecting mechanism for a power piston of a brake booster.

2. Description of the Prior Art

In the type of brake booster power piston that has two sections, a plastic-made central portion and metal-made disc portion, a problem has been encountered as to how to connect the two sections without having any relative movement therebetween and yet without having difficulty in connecting and disconnecting the same during the assembly and disassembly procedure of the brake booster.

Also known are brake boosters which have one-piece plastic power pistons shown, for example, in U.S. Pat. No. 3,938,424. However, plastic materials have been found to be weak, due to their nature, with respect to their resistance to destruction under high temperature. Brake boosters are disposed within the engine room of the vehicle and, therefore, the disc portion (i.e., 12b) of the power piston of this patent must be relatively thick for resistance to temperature if it is made of plastic even though such thickness is not necessary from a functional point of view. Thus, the increase in thickness of the disc portion causes an increase in the total weight of the booster itself. As compared with plastic, the inventor of the present invention has learned that metal plate will not be influenced due to the engine room temperature (about 70° C. to 80° C. maximum). Furthermore, the central portion of the piston in the present invention may be commonly used in any size of booster. Only the diameter of the metal portion in the present invention may be changed in accordance with the size of the booster used. This will result in a reduction in cost as compared to a conventional one-piece, plastic power piston as described hereinabove.

SUMMARY OF THE INVENTION

Accordingly, the object of the present invention is to resolve the above problem by providing a plate member between the two sections, wherein the plate member includes a detent mechanism and projections with which one of the two sections is engageable when assembled and disengageable when disassembled.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
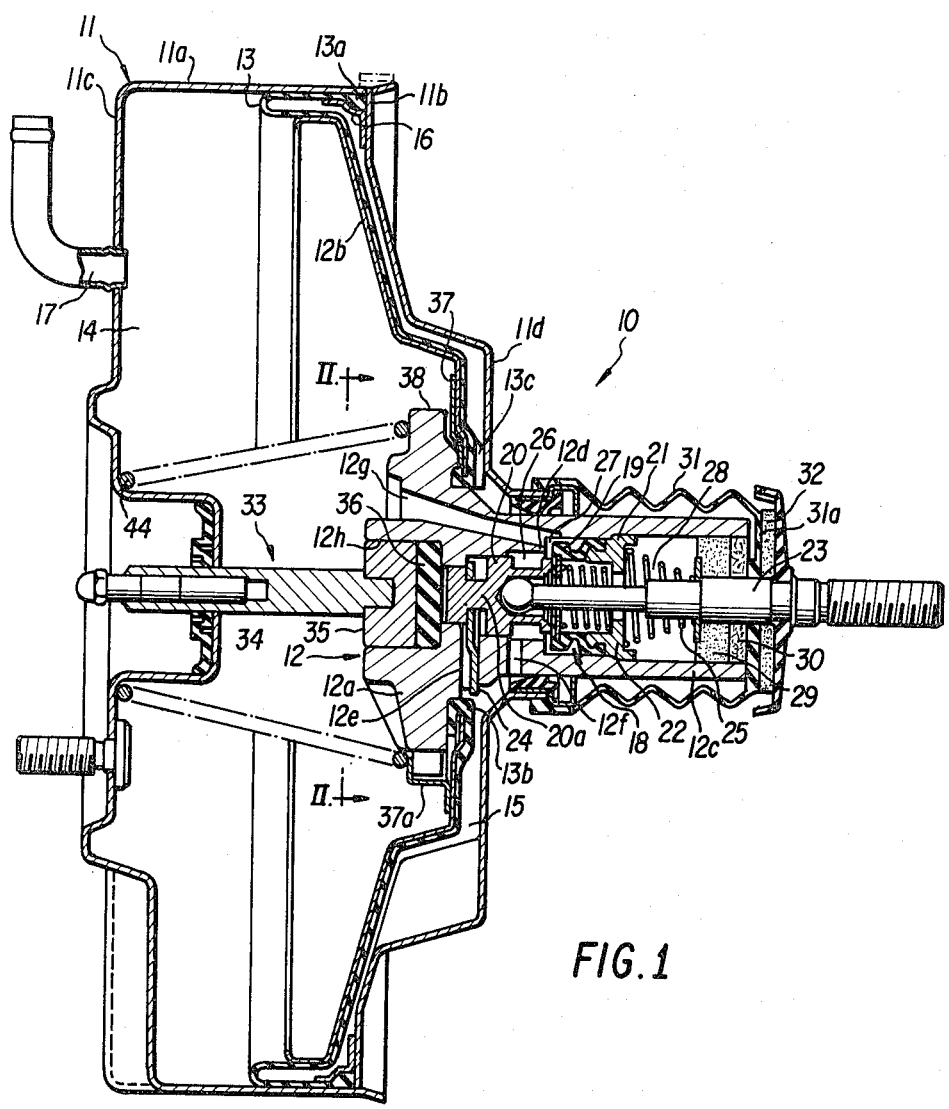
FIG. 1 is a cross-sectional view of the present invention.

Reference numeral 10 generally designates a vacuum type brake booster which has a housing 11 having a front and rear portion 11a, 11b, respectively.

The housing 11 is divided into two compartments 14 and 15 by a power piston 12 and a diaphragm 13. The power piston 12 includes a central portion 12a made of resin (plastic) and a disc portion 12b made of a metallic plate.

An outer peripheral portion 13a of the diaphragm 13 is in air-tight connection with the housing 11 by a securing member 16. An inner peripheral portion 13b of the diaphragm 13 extends along the rear (right side as viewed in FIG. 1) side of the inner periphery of the disc portion 12b of the power piston 12 and through the inside of the disc portion 12b to the front (left side as viewed in FIG. 1) side thereof so that the inner peripheral portion 13b of the diaphragm 13 may be air tightly secured between the central portion 12a of the power piston 12 and the inner periphery of the disc portion 12b.

One of the compartments 14 and 15 is connected with an engine intake manifold (not shown) through a port 17 provided on a front wall 11c of the housing 11. The central portion 12a of the power piston 12 is provided with an axial portion 12c which extends outwardly through a rear wall 11d of the housing 11. The axial portion 12c is air tightly and slidably supported by the rear wall 11c of the housing 11 through a seal member and bearing members.

The interior portion of the axial portion 12c is provided with a control valve mechanism 18 which includes an air valve 20 and a control valve 19. The control valve 19 is secured at its fixed end to the inner wall of the axial portion 12c through retainer member 21 and is (at a front portion thereof) biased at its movable end toward a seat 12d provided on a shoulder of the axial portion 12c by a spring 22 provided within the control valve. The inner peripheral portion of the front surface of the control valve 19 serves as a valve seat for air valve 20.

The air valve 20 is connected with a push rod 23 which is operatively connected to a brake pedal (not shown). The air valve 20 is provided with a reduced diameter portion 20a for engagement with a fork shaped portion of a key member 24 which is inserted into a radial slot 12e provided in the central portion 12a of the power piston 12. The arrangement of the key member and the reduced diameter portion 20a of the air valve is clearly shown in U.S. Patent application Ser. No. 960,626 filed on Nov. 14, 1978, now pending.

Rearward movement of the air valve 20 relative to the power piston is limited to a predetermined amount by the key member 24. Spring 25 is provided between a shoulder of the push rod 23 and the rear end of the control valve mechanism 18 and serves as a return spring for brake pedal release. Spring 25 also biases push rod 23, control valve 19, and air valve 20 to the position as shown in FIG. 1 wherein the left end surface of the fork-shaped portion of the key member 24 is in contact with the left portion of the air valve 20. Under this condition, the rear compartment 15 is in communication with the front compartment 14 through radial passage 12f, passage 26 at the outer periphery of the air valve 20, space 27 between the control valve 19 and valve seat 12d and in the central portion 12a of the power piston 12. Thus, both compartments 14 and 15 are filled with the same level of vacuum from the intake manifold. Return spring 44 in the front compartment biases the power piston 12 toward the right as shown in FIG. 1.

In operation, when the brake pedal is depressed, push rod 23 and air and control valves 20 and 19 move forwardly (to the left in FIG. 1) relative to power piston 12. The control valve 19 first comes in contact with the seat 12d to interrupt communication between the front and rear compartments and then air valve 20 is separated from the control valve 19 to thereby establish at communication of the rear compartment 15 through radial passage 12f, passage 26, the space between the air and control valves 20 and 19, the interior of the control valve 19, retainer 21 of the control valve, passage 28 of the axial portion 12c, filters 29 and 30, passage 31a in a boot 31 and air filter 32. Due to the pressure differential between the two compartments 14 and 15, power piston 12 moves to the left against the force of spring 44.

It should be noted that output member 33 includes a rod member 34 which slidably and sealingly penetrates the front wall portion of the housing 11. The outer end of the rod 34 is operatively connected to a master cylinder (not shown) for operating the same. The output member 33 further includes a member 35 securely connected to the other (inner) end of the rod 34 which is slidably received in a recess 12h of the central portion 12a of the power piston 12. Between the member 35 and the air valve 20 is disposed a rubber reaction disc member 36 through which the force generated by the leftward movement of power piston 12 is transmitted to the output member 33. When the above-noted transmission occurs, the rubber disc member 36 is compressed and deformed so as to be in contact with the front face of the air valve 20 and thus serves as a reaction member transmitting a reaction to the brake pedal in proportion to the force of power piston 12.

The rearward movement of power piston 12 is limited by a plurality of stoppers 13c provided on the rear side of the inner peripheral portion 13b of the diaphragm 13 when the stoppers contact with the rear wall 11d of the housing 11. The flange portion 38 of the central portion 12a has three recesses 39 and three stoppers 40. The distance between each end 39a of the recess 39 and closest stopper 40 is slightly larger than the length of the detent 37a of the plate 37 for receiving the detent 37a between each end 39a when assembled.

Three projections 41 are provided on the plate 37 for engaging with each other end 39a of the recess 39 when assembled. Reference numeral 42 designates a sloped portion provided at one end 39a of the recess 39 and reference numeral 43 designates a sloped portion provided at both ends of detent 37a. Each sloped portion 42 and 43 is provided for facilitating relative movement of the detents 37a with respect to the flange 38 of the central portion 12a.

Figure 2:
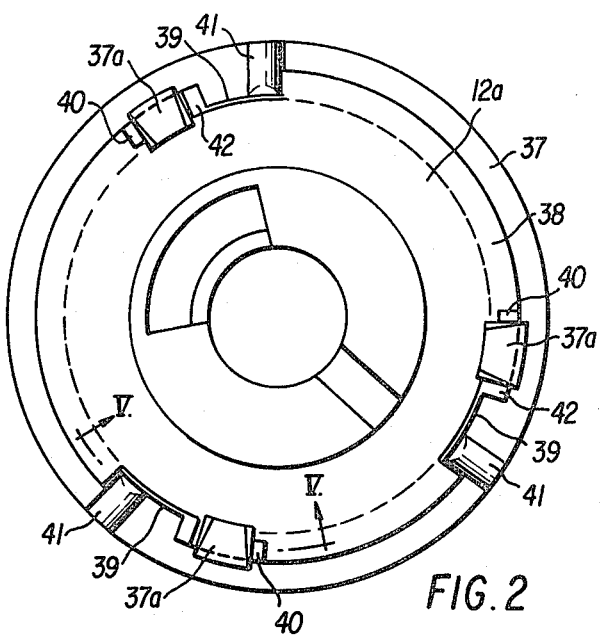
FIG. 2 shows a perspective view from the II—II in FIG. 7 and shows the assembled condition of the present invention.
Figure 3:
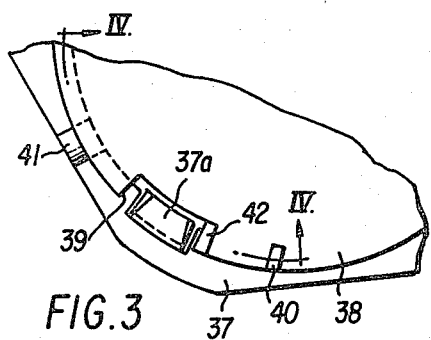
FIG. 3 is a view similar to FIG. 2 but which shows the unassembled condition of the present invention.
Figure 4:
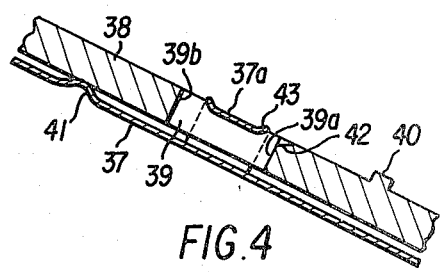
FIG. 4 shows a cross-sectional view taken along line IV—IV in FIG. 3.
Figure 5:
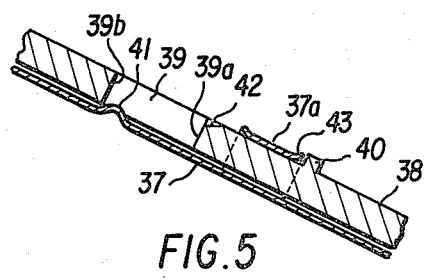
FIG. 5 shows a cross-sectional view taken along line V—V in FIG. 2.

During assembly, the plate 37 secured to an inner peripheral portion 45 the metallic disc portion 12b is rotated in a counterclockwise direction (from the position of FIG. 3 or FIG. 4 to the position of FIG. 2 or FIG. 5), the detents 37a of the plate 37 are slidably moved from the recesses 39 onto the front surface of the flange 38 until such engage with their corresponding stoppers 40 provided on flange 38. Projections 41 are then engaged with the other end 39b of the recesses 39 to thereby prevent the plate 37 from rotational movement with respect to flange 38 of the central portion 12a. When being dismounted, the plate 37 can be rotated in the other direction (i.e. clockwise direction as viewed in FIG. 2).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A brake booster for operation and connection with a brake pedal, comprising:
   a housing having an inner wall;
   a diaphragm, an outer end portion thereof being secured to the inner wall of the housing;
   a power piston movably disposed in the housing and air-tightly connected to an inner end portion of said diaphragm to thereby divide an interior space of said housing into first and second compartments, wherein said power piston further comprises a central portion which comprises resin and a metallic disc member surrounding and connected to said central portion;
   control valve means positioned within said power piston for generating a pressure difference between said first and second compartments in response to operation of said brake pedal;
   connecting means for connecting said central portion and said metallic disc member wherein said connecting means comprises a flange portion formed on an outer peripheral portion of said central portion of said piston and positioned in front of a radially inner peripheral portion of said metallic disc member; and
   plate means, having a plurality of detent members operatively associated therewith, interposed between said flange portion and said inner peripheral portion of said metallic disc member and secured to said inner peripheral portion of said metallic disc, said flange portion having a plurality of recesses axially formed therein and which further comprises a plurality of stopper members positioned on a front surface of a said flange portion wherein said plate means further comprises a plurality of projecting members respectively axially extending into said plurality of recesses and wherein said plurality of detent members respectively engage said plurality of stopper members.

2. The brake booster as set forth in claim 1, wherein said flange portion further comprises a sloped portion formed therein for cooperating with at least one of said plurality of recesses, and each of said plurality of detent members includes a sloped portion for cooperatively engaging each said sloped portion of said flange portion for facilitating relative movement of said detent members with respect to said flange portion.

3. The brake booster as set forth in claims 1 or 2, wherein the distance between opposite end portions of each of said recesses of said flange portion is greater than the radial length of each of said detent members.

4. The brake booster as set forth in claims 1 or 2, wherein said plurality of recesses and said plurality of detent members further comprise three recesses and three detent members, respectively.

* * * * *